US005542233A

United States Patent [19]
Graffin

[11] Patent Number: 5,542,233
[45] Date of Patent: Aug. 6, 1996

[54] PACKAGING INSTALLATION FOR RECEPTACLES EACH HAVING A BASE PRESENTING AT LEAST ONE LONG SIDE AND AT LEAST ONE SHORT SIDE

[75] Inventor: André Graffin, La Chapelle Du Bois, France

[73] Assignee: SERAC, La Ferte Bernard, France

[21] Appl. No.: 348,966

[22] Filed: Nov. 28, 1994

[30] Foreign Application Priority Data

Dec. 2, 1993 [FR] France .................. 93 14454

[51] Int. Cl.⁶ ........................................ B65B 1/00
[52] U.S. Cl. .................... 53/282; 53/367; 198/475.1; 198/477.1
[58] Field of Search ............... 53/282, 367; 198/415, 198/412, 625, 803.14, 476.1, 475.1, 477.1

[56] References Cited

U.S. PATENT DOCUMENTS

| | | | |
|---|---|---|---|
| 3,467,237 | 9/1969 | Hanekump et al. | 198/415 |
| 3,927,508 | 12/1975 | Campbell | 53/542 |
| 4,567,919 | 2/1988 | Fogg et al. | 198/625 |
| 4,760,910 | 8/1988 | Suzuki et al. | 198/412 |
| 4,770,286 | 9/1988 | Opperthauser | 198/476.1 |
| 5,224,586 | 7/1993 | Naka et al. | 198/803.14 |
| 5,355,991 | 10/1994 | Baranowski | 198/412 |

FOREIGN PATENT DOCUMENTS 0492371  12/1991  European Pat. Off. .

Primary Examiner—John Sipos
Assistant Examiner—Gene L. Kim
Attorney, Agent, or Firm—Griffin, Butler, Whisenhunt & Kurtossy

[57] ABSTRACT

It comprises a transport member on which the receptacles have a displacement direction corresponding to their long sides, at least one rotary packaging platform, and a rotary transfer member for transferring the receptacles from the transport member to the packaging platform, and a swivelling member disposed between the transport member and the transfer member to position the receptacles on the transfer member with their long sides extending in substantially radial manner.

2 Claims, 3 Drawing Sheets

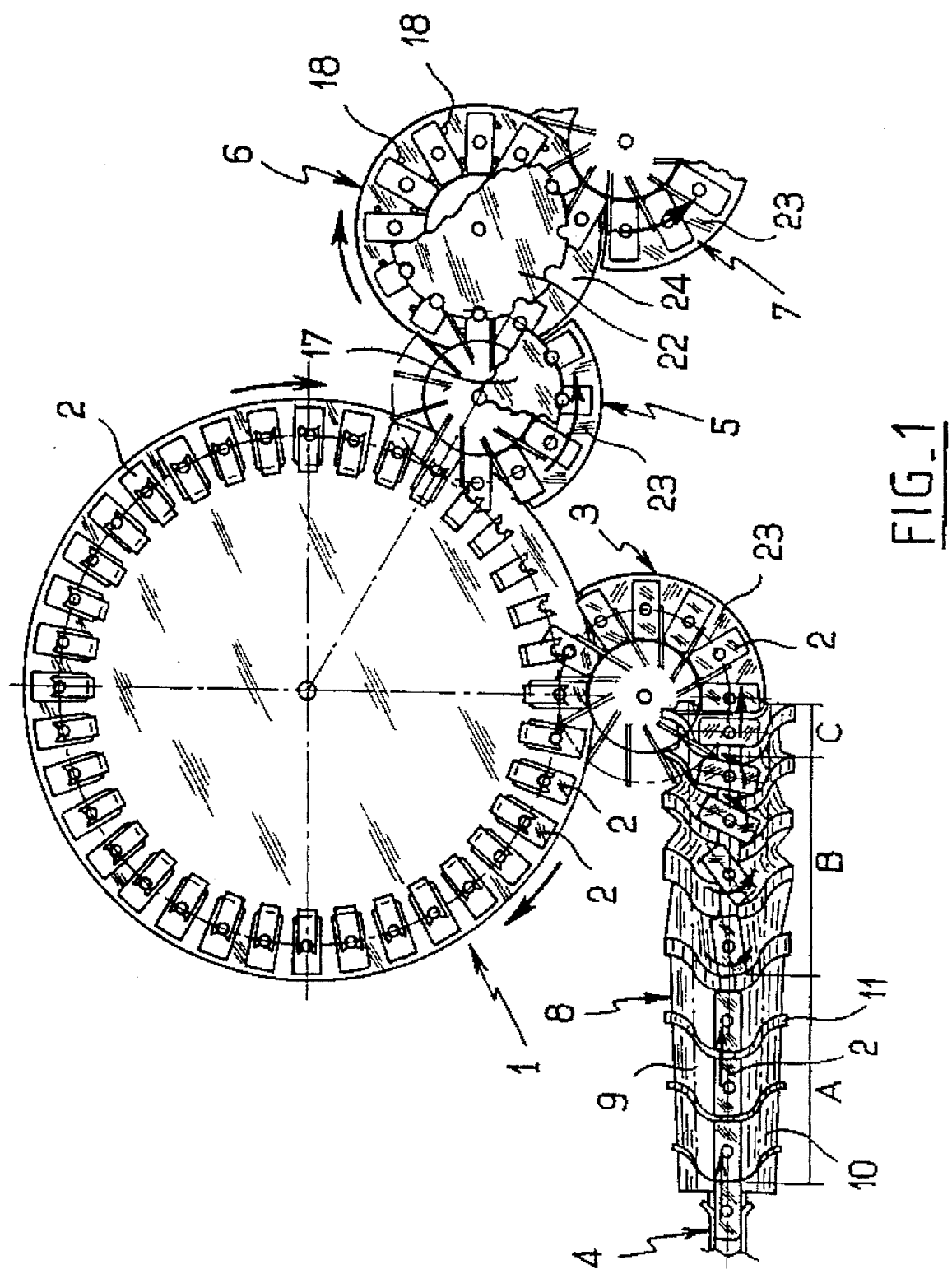
FIG_1

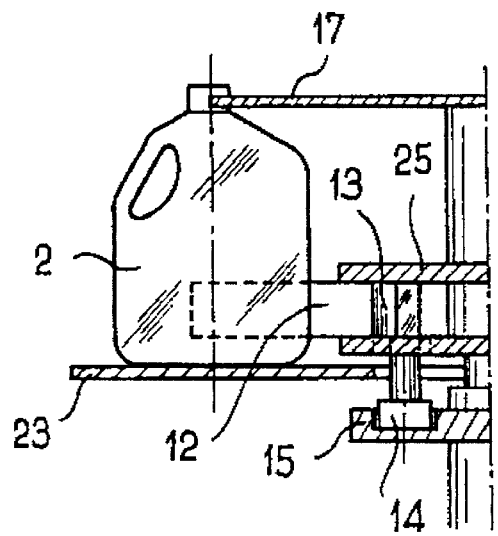
FIG_2
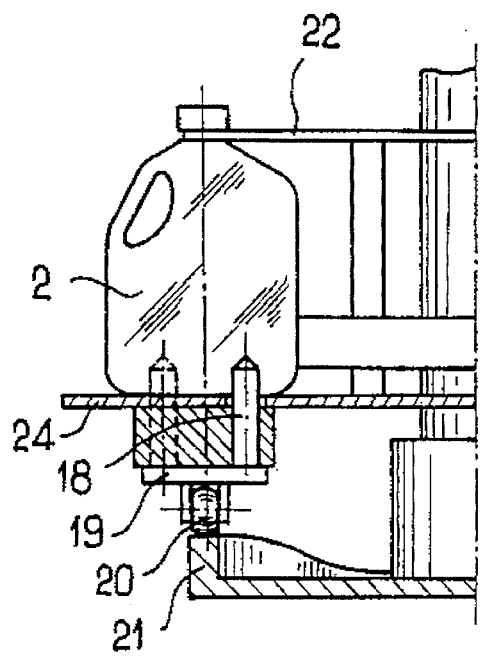
FIG_3
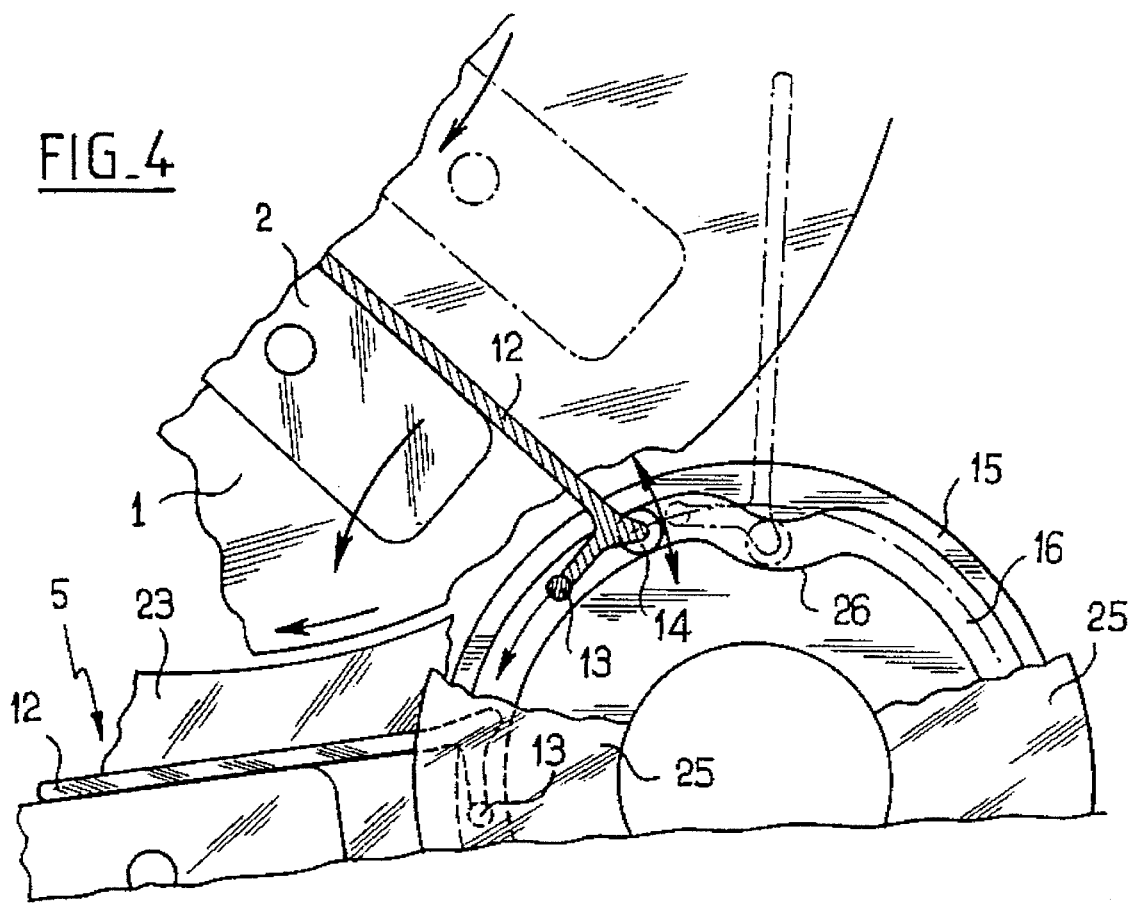
FIG_4

PACKAGING INSTALLATION FOR RECEPTACLES EACH HAVING A BASE PRESENTING AT LEAST ONE LONG SIDE AND AT LEAST ONE SHORT SIDE

The present invention relates to a packaging installation for receptacles each having a base presenting at least one long size and at least one short side.

BACKGROUND OF THE INVENTION

Packaging installations, in particular installations for filling receptacles, are known that comprise a rotary packaging platform supporting a series of packaging stations to which the receptacles are brought by a rotary transfer member from a transport member on which the receptacles move, generally in linear manner. In existing installations, the transport member is disposed so that the displacement direction of the receptacles on the transport member is tangential to the direction in which the receptacles move when they are on the transfer member, such that the position of each receptacle relative to said tangential direction is not altered on transfer of the receptacle from the transport member to the rotary conditioning platform.

That particular disposition of the receptacles does not present any particular drawback when the receptacles have a base that is circular or polygonal with sides of the same dimensions. In contrast, when each receptacle has a rectangular base presenting a long side and a short side, then the receptacles are generally disposed on the transport member with their long sides extending in their displacement direction, for reasons of stability while they are being transported. The receptacles are then positioned on the transfer member and on the packaging platform so that their long dimension extends tangentially to the rotary motion such that the receptacles take up a large amount of space around the periphery of the packaging platform, thus limiting the number of packaging stations that can be installed on a platform, and consequently reducing the packaging throughput of the installation.

OBJECTS AND SUMMARY OF THE INVENTION

According to the invention, a packaging installation of the above-specified type is proposed for receptacles each having a base presenting at least one long side and at least one short side, and in which a means is provided for positioning the receptacles on the transfer member so that the long side extends substantially radially.

Thus, when the receptacle passes from the rotary transfer member to the rotary packaging platform, the substantially radial position of the long side of the receptacle is conserved and the receptacle then occupies little space on the packaging platform, thus making it possible to increase the number of packaging stations on the platform.

In one advantageous version of the invention, the means for positioning the receptacles on the transfer member is constituted by a swivelling member disposed between the transport member and the transfer member.

In one aspect of the invention, the swivelling member includes two screws mounted to rotate about axes that are substantially parallel to the displacement direction of the receptacles on the transport member, the screws including respective threads comprising first portions in which the threads face each other and in which they are of increasing thickness, and second portions downstream from the first portions in the receptacle displacement direction and in which the threads become increasingly mutually offset. In this way, the receptacles which are in contact with one another on the transport member are progressively moved apart from one another and are then swivelled to take up the direction that is desired on the transfer member.

In an advantageous further aspect of the invention, the transfer member includes moving flaps disposed to bear against the receptacles when they are on the transfer member and to pivot away during loading onto the transfer member or unloading therefrom.

BRIEF DESCRIPTION OF THE DRAWINGS

Other characteristics and advantages of the invention also appear on reading the following description of non-limiting particular embodiments of the invention given with reference to the accompanying figures, in which:

FIG. 1 is a diagrammatic plan view of a packaging installation constituting a first embodiment of the invention;

FIG. 2 is a diagrammatic section view on a radial plane through the transfer member of FIG. 1;

FIG. 3 is a fragmentary diagrammatic section view of the stoppering platform of the invention;

FIG. 4 is a fragmentary diagrammatic plan view showing the movement of a flap while loading a receptacle onto the transfer member of FIG. 1;

MORE DETAILED DESCRIPTION

Figure 5:
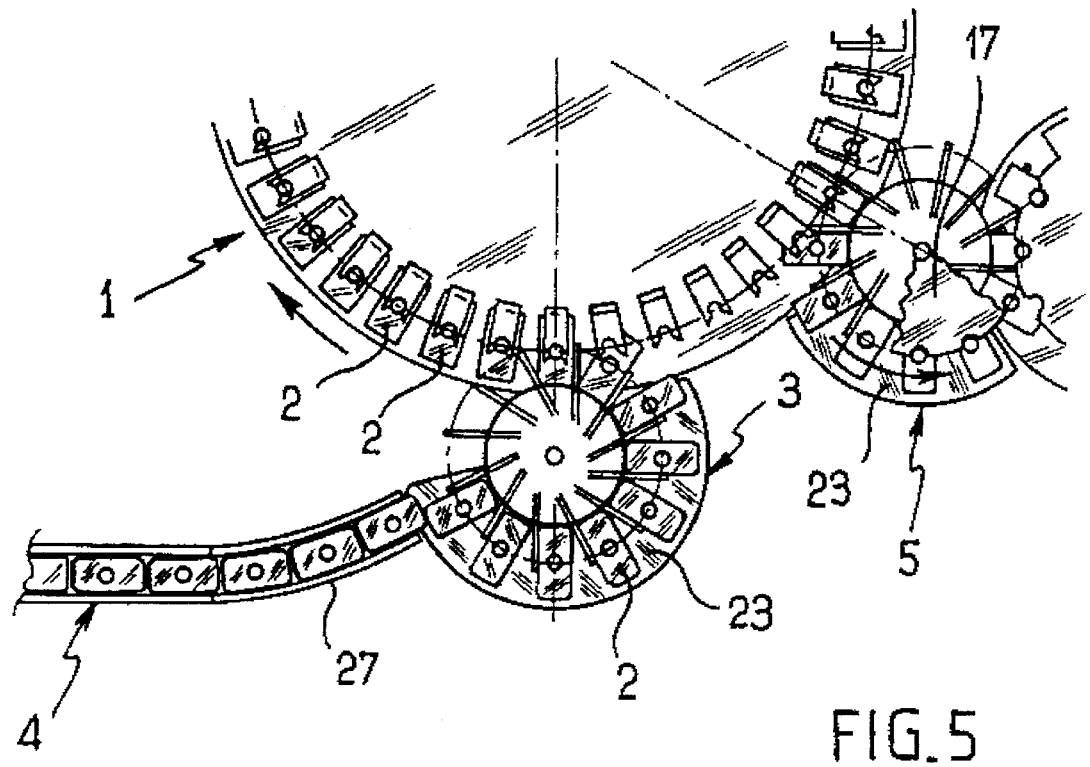
FIG. 5 is a fragmentary plan view analogous to that of FIG. 1, but showing a second embodiment of the invention.

With reference to the figures and in conventional manner, the installation comprises a rotary filling platform 1 onto which receptacles 2 are loaded by a transfer member 3 from a transport member 4. At the outlet from the filling platform, the receptacles are transferred by a transfer member 5 onto a rotary stoppering platform, and they are then removed from the installation by a transfer member 7.

The installation of the invention is designed for packaging receptacles each having a base that is generally rectangular with a long side and a short side. On the transport member 4, the receptacles are disposed with their long sides extending in the receptacle displacement direction. According to the invention, the installation includes a means for positioning the receptacles on the transfer member so that their long sides extend substantially radially.

In the first embodiment of the invention, said means comprises a swivelling member given general reference 8 and comprising two wormscrews 9 and 10 having threads 11 which, relative to the receptacle displacement direction, comprise: first portions A in which the threads face each other and are of increasing thickness, thereby progressively moving the receptacles 2 further apart from one another; second portions B in which the threads become increasingly offset, thereby causing the receptacles to swivel until their long sides extend in a direction substantially perpendicular to the initial direction, with the new direction corresponding to a radius of the transfer member at the point where the receptacles are applied to the transfer member; and third portions C in which the threads face each other again so as to displace the receptacles while maintaining substantially constant orientation.

To ensure positive drive of the receptacles on the transfer member while avoiding interference when loading or unloading the receptacles, the transfer members 3, 5, and 7 of the invention preferably include moving flaps 12 mounted to pivot on axes 13 that are secured to the moving portion of the transfer member 25 so as to move in circular manner as shown by the chain-dotted line in FIG. 4. The pivoting motion of each flap 12 about its pivot axis 13 is designed to pivot flaps 12 away immediately prior to loading and unloading and pivot toward the receptacles during the loading and unloading operations. This operation is controlled by a control wheel 14 that is offset from the pivot axis 13 and that is disposed to co-operate with a stationary cam 15 which, in the embodiment shown, comprises a groove 16 in which the wheel 14 slides. Wheel 14 moves in groove 16 in a stable position until it traverses a recess 26 causing the flaps 12 to pivot. During rotation of the moving portion 25 of the transfer member, the receptacles driven by the flaps 12 slide over a stationary support plate 23. For improved receptacle stability during transfer, the transfer member also includes a plate 17 secured to the moving portion 25 and serving to hold the necks of the receptacles. The moving portion 25 is illustrated in FIG. 2 and in a fragmentary view in FIG. 4.

In an advantageous aspect of the invention for an installation that includes a rotary stoppering platform 6 disposed downstream from the filling platform, the transfer member 5 for transferring receptacles from the filling platform 1 to the stoppering platform 6 is preferably analogous in structure to the transfer member 3 so that the receptacles are held contiguously with their long sides extending substantially radially, thereby minimizing the volume generally occupied by the installation.

In order to enable the stoppers to be tightened while also enabling the receptacles to be inserted and removed easily relative to the stoppering platform, the stoppering platform includes retractable holding studs 18 that pass through a rotary supporting turntable 24. A pair of holding studs 18 is disposed diagonally on opposite sides of each receptacle location, and least pair of holding studs 18 is carried by a turntable 19 secured to a control wheel 20 that rests against the top edge of a stationary cam 21. The profile of the stationary cam 21 is designed so that the holding studs 18 are retracted at the moment a receptacle 2 is applied to the support turntable 24 and also at the moment a receptacle is unloaded from the stoppering platform 6, and they are raised on opposite sides of a receptacle 2 during the stoppering stage between insertion and removal of the receptacle. As before with respect to the transfer member, the stoppering platform includes a plate 22 for holding the necks of the receptacles.

FIG. 5 shows a second embodiment which differs from the embodiment of FIG. 1 only in the means that position the receptacles on the transfer member so that their long sides extend radially. In this second embodiment, said means is constituted by a swivelling member comprising a curvilinear guide 27 extending a lateral guide wall of the transport member 4 so that the receptacles 2 follow a curved path that brings the long sides of the receptacles progressively into a direction that is substantially radial relative to the transfer member so that the receptacles are applied to the transfer member successively by being pushed thereon by the following receptacles that are driven by the transport member 4.

Figure 6:
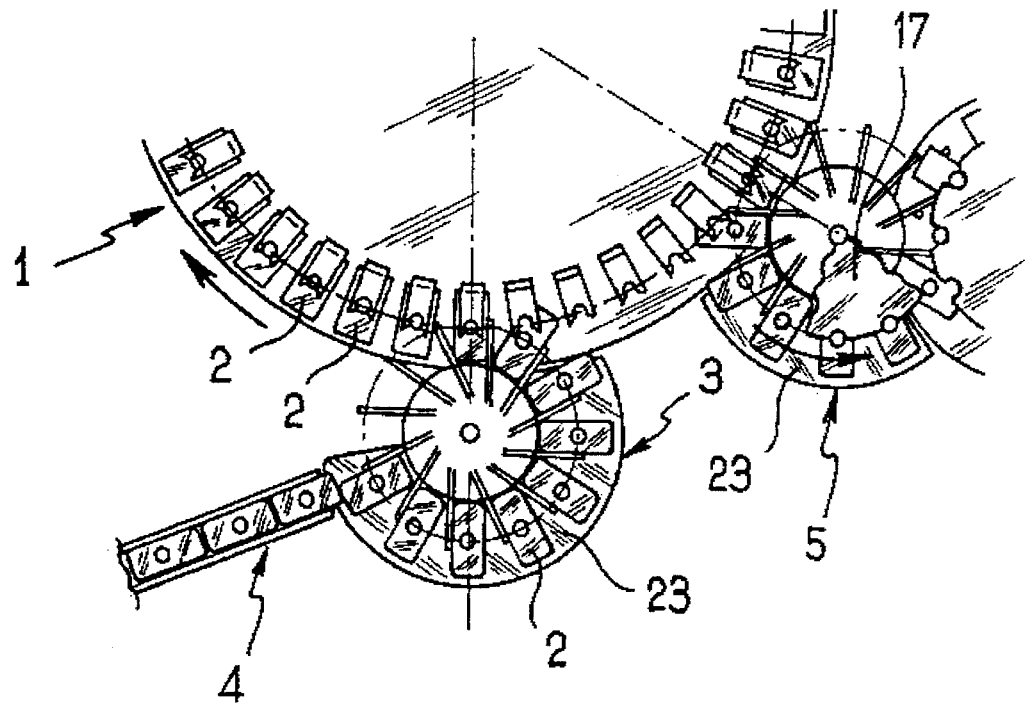
FIG. 6 is a fragmentary plan view analogous to that of FIG. 1, but showing a third embodiment of the invention.

In the first and second embodiments, the transport member 4 extends in a direction that is substantially tangential to the transfer member 3, thereby minimizing the ground area occupied by the installation. If ground area constraints are not a problem, it is also possible to cause the transport member 4 to lead directly to the transfer member, with the means for positioning the receptacles with their long sides extending radially then being constituted by the radial disposition of the transport member 4, as shown in FIG. 6, the remainder of the installation being analogous to that of FIG. 1.

Naturally, the invention is not limited to the embodiments described and variants can be applied thereto without going beyond the ambit of the invention as defined by the claims.

In particular, although the member for swivelling the receptacles in the first embodiment is described as being in the form of two wormscrews, it is possible to use other swivelling systems to cause the receptacles to pivot so as to be presented with their long sides extending substantially radially at the moment they are loaded onto the transfer member.

Similarly, although the wormscrews of the first embodiment are shown as having threads in three portions, given that the third portion is designed to stabilize the receptacles during a final positioning stage prior to loading on the transfer member, it would be possible to provide wormscrews having threads with two portions only, with loading onto the transfer member being performed at the instants at which the receptacles have been swivelled into the desired direction.

When the installation includes a linear filling device followed by a rotary stoppering platform, the swivelling device of the invention will naturally be disposed downstream from the filling device prior to receptacles being applied to the transfer member associated with the stoppering platform.

Although the installation is described above with reference to receptacles each having a base that is substantially rectangular, an installation of the invention may advantageously be likewise applied to receptacles each having a non-regular base that is curvilinear or polygonal.

I claim:

1. A packaging installation including a rotary platform on which receptacles each having a base presenting one long side and at least one short side are disposed with the long side extending radially, and at least one rotary transfer member radially adjacent to said rotary platform for feeding to or receiving receptacles from said platform and cooperating with a stationary support plate on which the receptacles move according to a substantially curvilinear direction while keeping the long side in a substantially radial direction with respect to a rotating portion of said rotary transfer member said transfer member further including flaps mounted on said rotating portion for rotation about pivot axes and means for changing an orientation of said flaps with respect to said rotating portion so that said flaps bear against the receptacles and maintain said receptacles with the long side extending in a substantially radial direction when they are on the transfer member, and to pivot away from said receptacles with respect to said rotary portion immediately prior to loading onto the rotary transfer member or unloading therefrom for avoiding interference of the flaps with adjacent receptacles on said rotary platform during loading or unloading and pivot toward said receptacles during said loading and unloading operations.

2. A packaging installation according to claim 1 wherein each flap includes a control wheel offset relative to said pivot axis and disposed to cooperate with a stationary cam.

* * * * *